Nov. 26, 1946.   J. A. BOYAJIAN   2,411,612
AUTOMATIC PHONOGRAPH
Filed June 20, 1940   11 Sheets-Sheet 1

Inventor
James A. Boyajian
By McCaleb & Shendt
Attys.

Nov. 26, 1946. J. A. BOYAJIAN 2,411,612
AUTOMATIC PHONOGRAPH
Filed June 20, 1940 11 Sheets-Sheet 5

Inventor:
James A. Boyajian
By McCaleb & Hewitt
Attys.

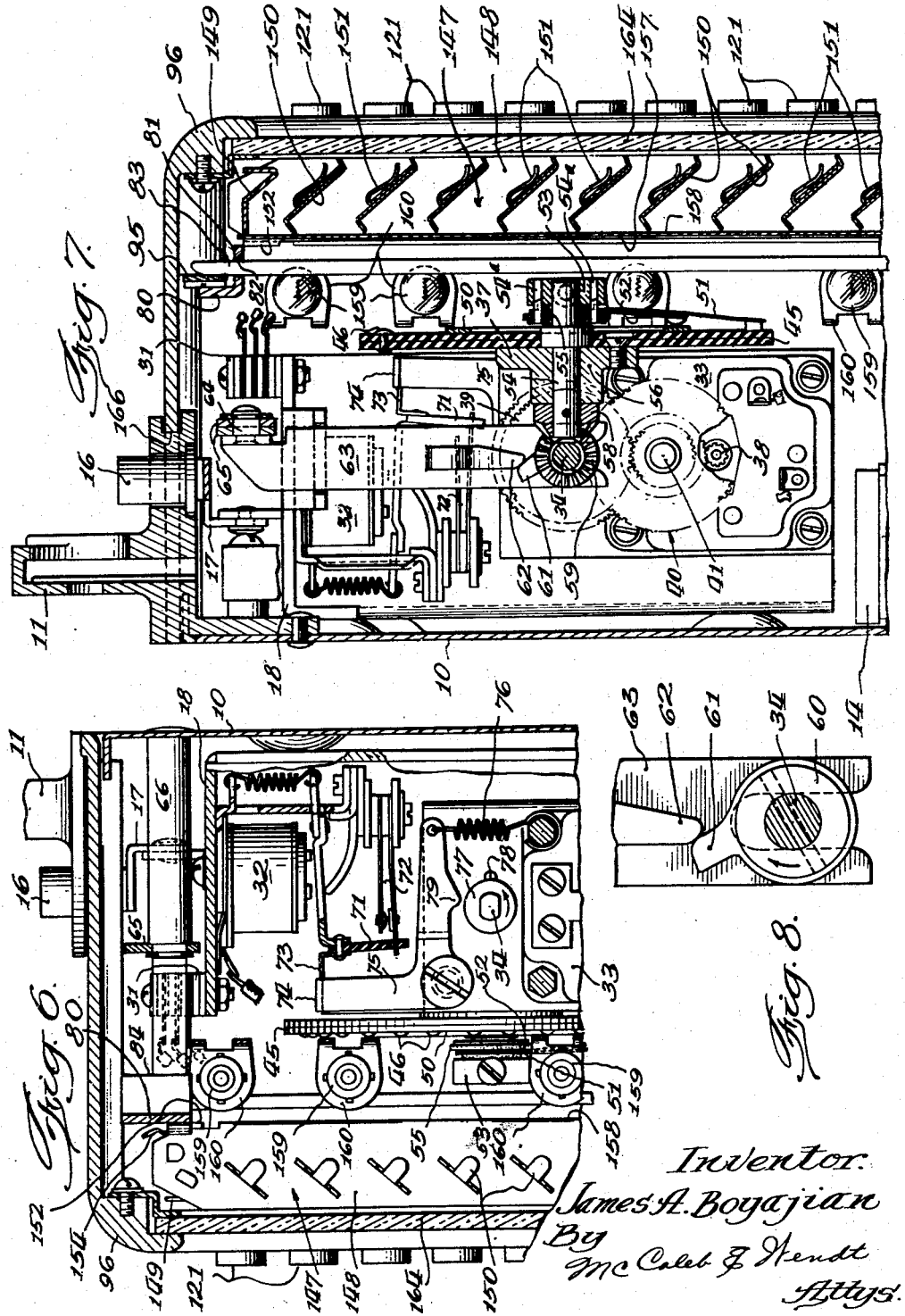

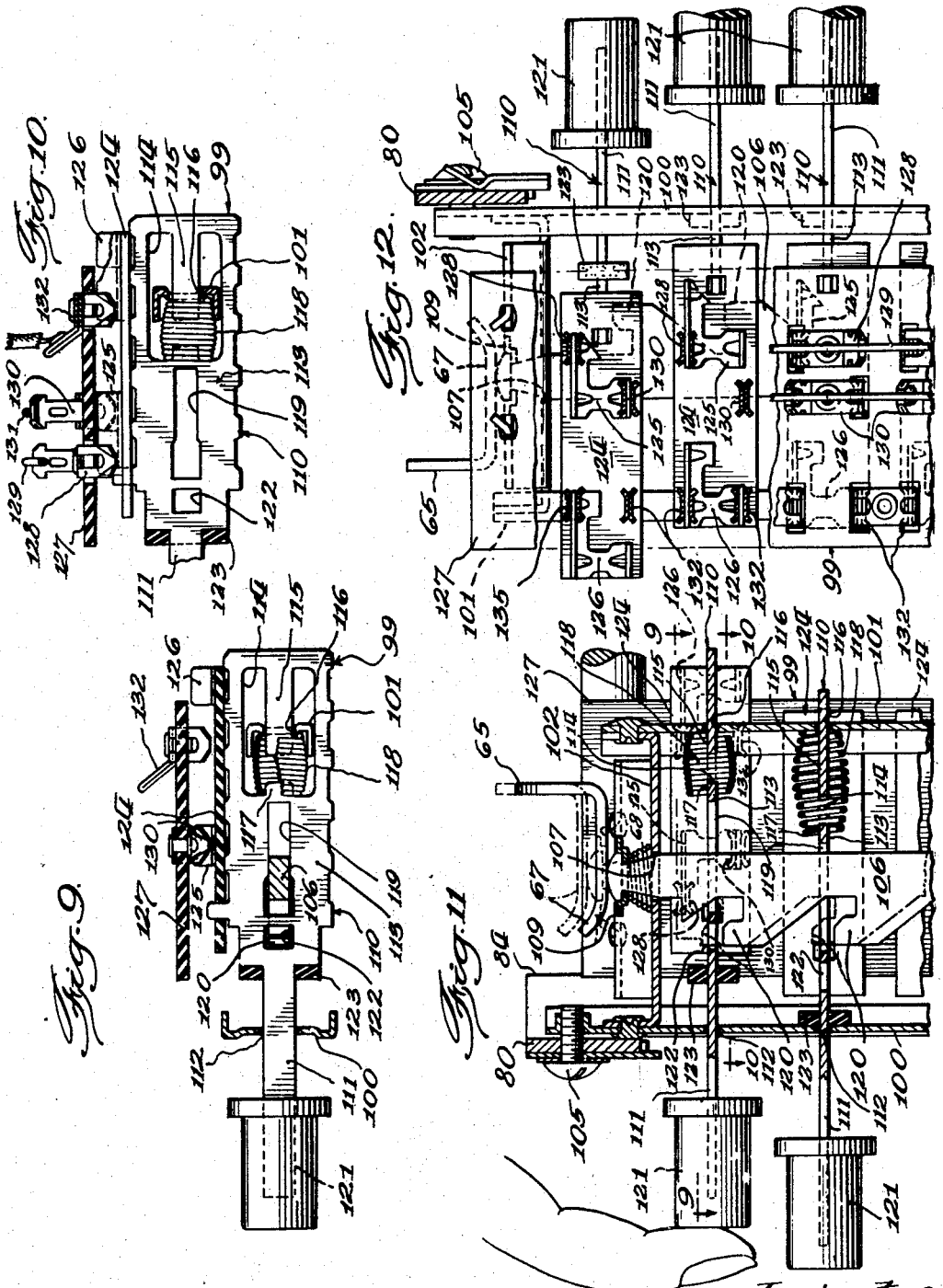

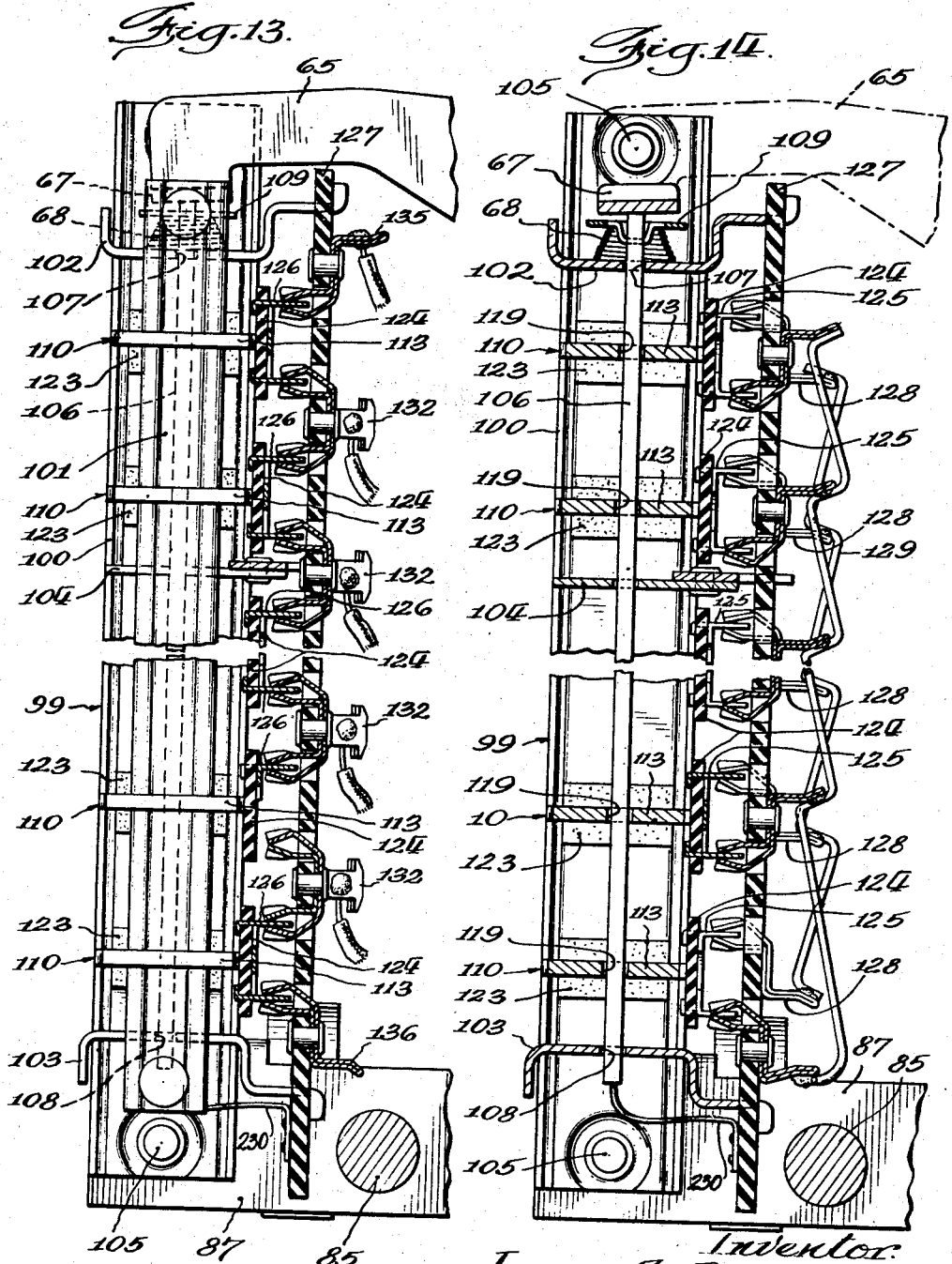

Nov. 26, 1946.　　　J. A. BOYAJIAN　　　2,411,612
AUTOMATIC PHONOGRAPH
Filed June 20, 1940　　11 Sheets-Sheet 9
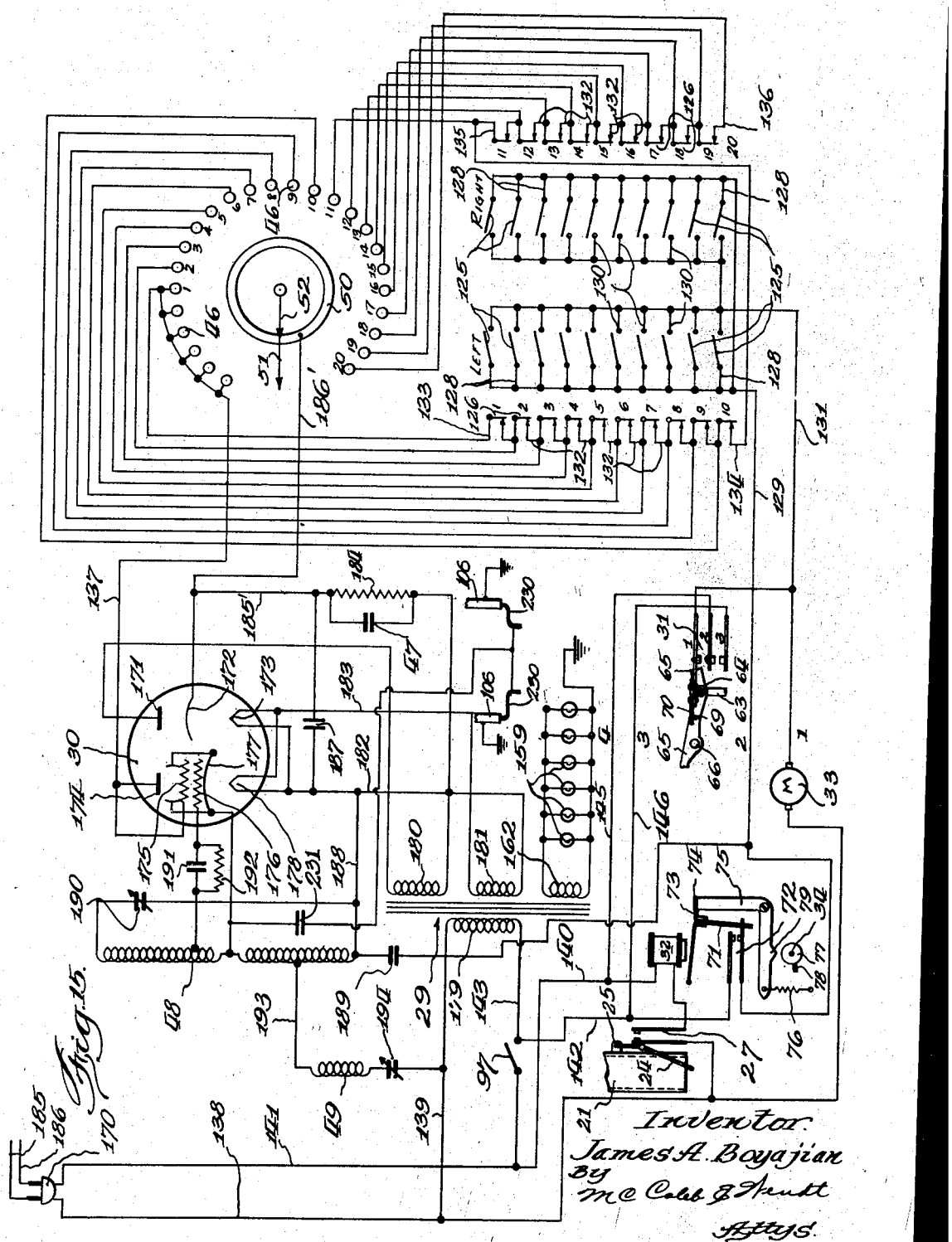

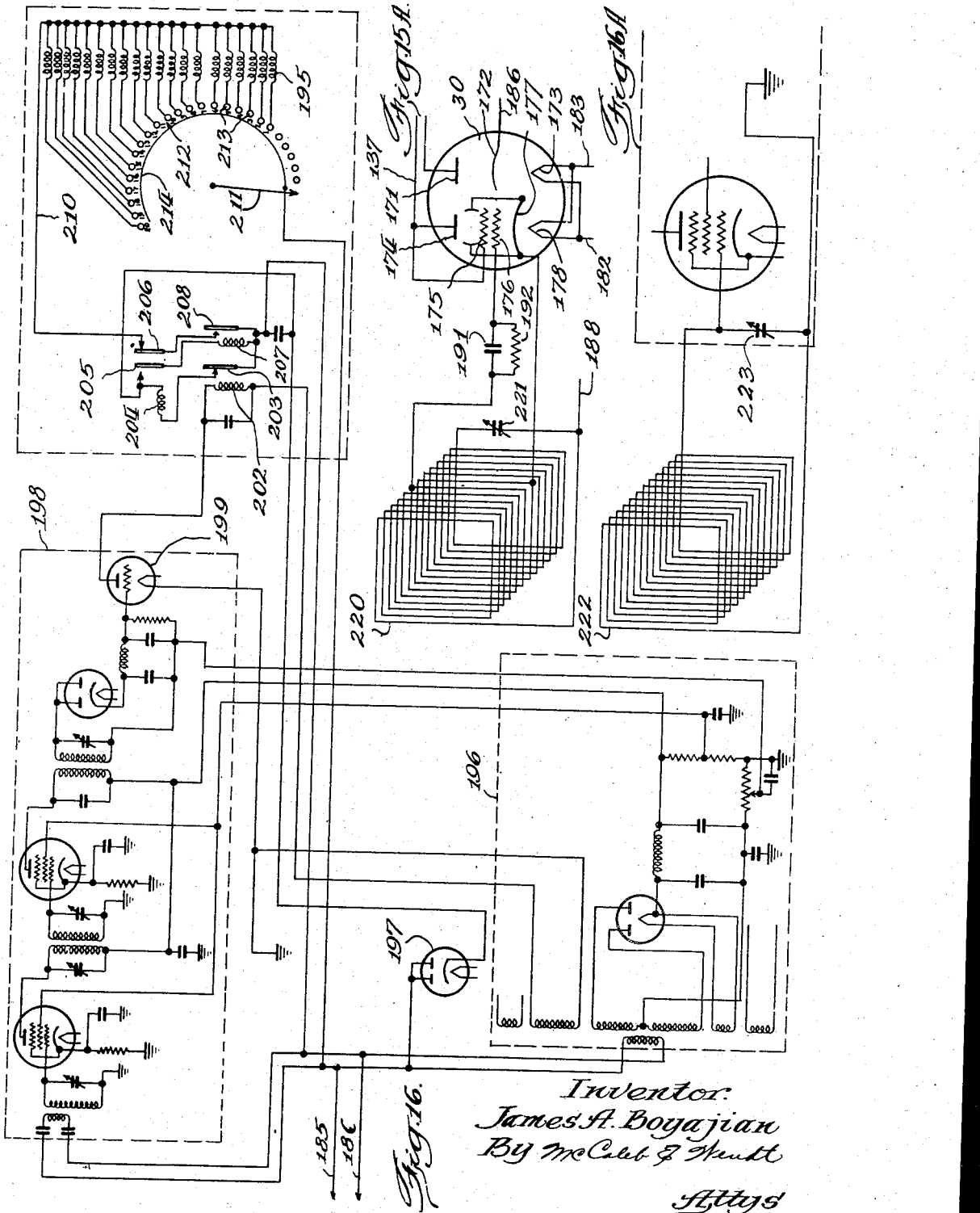

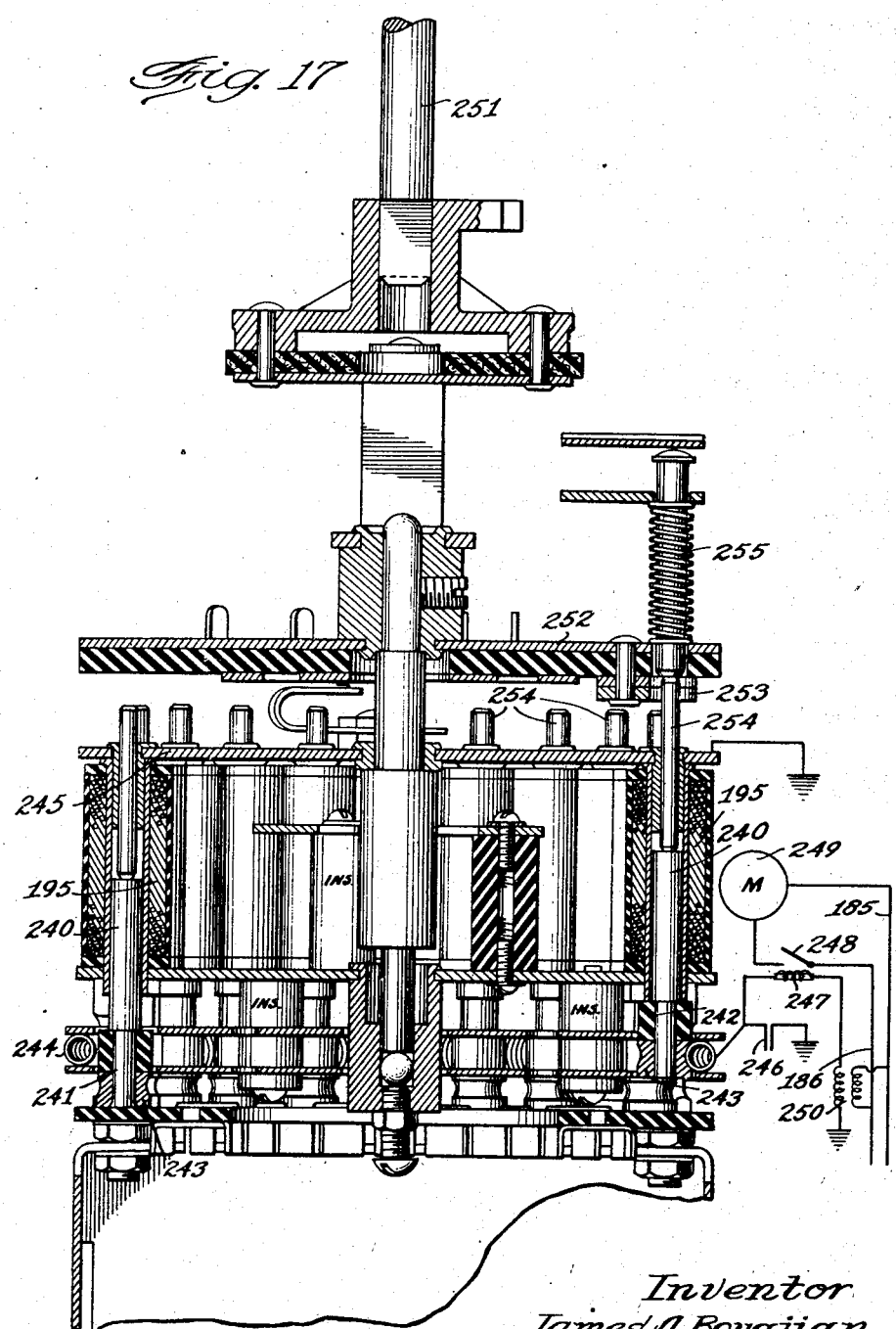

Patented Nov. 26, 1946

2,411,612

UNITED STATES PATENT OFFICE 2,411,612

AUTOMATIC PHONOGRAPH

James A. Boyajian, Chicago, Ill., assignor to J. P. Seeburg Corporation, a corporation of Illinois Application June 20, 1940, Serial No. 341,433

2 Claims. (Cl. 177—353)

This invention relates to automatic phonographs and particularly to a selector therefor which may be located in remote relation to the phonograph to effect the selection of any one or a plurality of selected recordings which the user may desire to play.

One of the objects of the invention is to provide a remote control unit for automatic phonographs which is adapted to be rendered operable upon the insertion of a coin or coins.

A further object of the invention is to provide an improved remote control unit for automatic phonographs which is adapted to be installed in the building in which the phonograph is located and to be connected to the phonograph without the necessity of installing special wires between the unit and the phonograph.

A further object of the invention is to provide an improved remote control unit for automatic phonographs which is adapted to transmit a definite number of electrical impulses corresponding to an individual recording to be played.

A further object of the invention is to provide an improved control for automatic phonographs, including a remote control unit which is adapted to control the phonograph unit by the transmission therebetween of series of various numbers of impulses of high frequency.

Other objects, advantages and capabilities of the invention will appear from the following description of preferred embodiments thereof with reference to the accompanying drawings, in which:

Fig. 6 is a fragmentary transverse sectional view of the upper end of the remote control device, the section being taken on the line 6—6 of Fig. 4;

Fig. 7 is a similar view, the section being taken on the line 7—7 of Fig. 1;

Fig. 8 is a fragmentary sectional detail of a cam mechanism, the section being taken on the line 8—8 of Fig. 4;

Fig. 9 is a sectional detail view of one of the selector bars and associated mechanism, the section being taken on the line 9—9 of Fig. 11, the bar being shown in its actuated position;

Fig. 10 is a similar view taken on the line 10—10 of Fig. 11, showing a selector bar in actuated position;

Fig. 11 is a longitudinal sectional view of the upper end of one of the switch assemblies, the section being taken on the line 11—11 of Fig. 2;

Fig. 12 is a similar view, the section being taken on the broken line 12—12 of Fig. 1;

Fig. 13 is a longitudinal sectional view through one of the switch assemblies, the section being taken on the line 13—13 of Fig. 2;

Fig. 14 is a similar view, the section being taken on the broken line 14—14 of Fig. 2;

Fig. 15 is a wiring diagram showing the electrical system of the remote control unit;

Fig. 16 is a wiring diagram showing the electrical system at the phonograph;

Fig. 15A is a fragmentary wiring diagram showing the modification of Fig. 15 to adapt the remote control unit for operation by space transmission;

Fig. 16A is a fragmentary wiring diagram showing the change of Fig. 16 to adapt the phonograph for receiving signals by space transmission; and Fig. 17 is a sectional detail and wiring diagram showing the manner in which the selector controls the phonograph motor.

Figure 1:
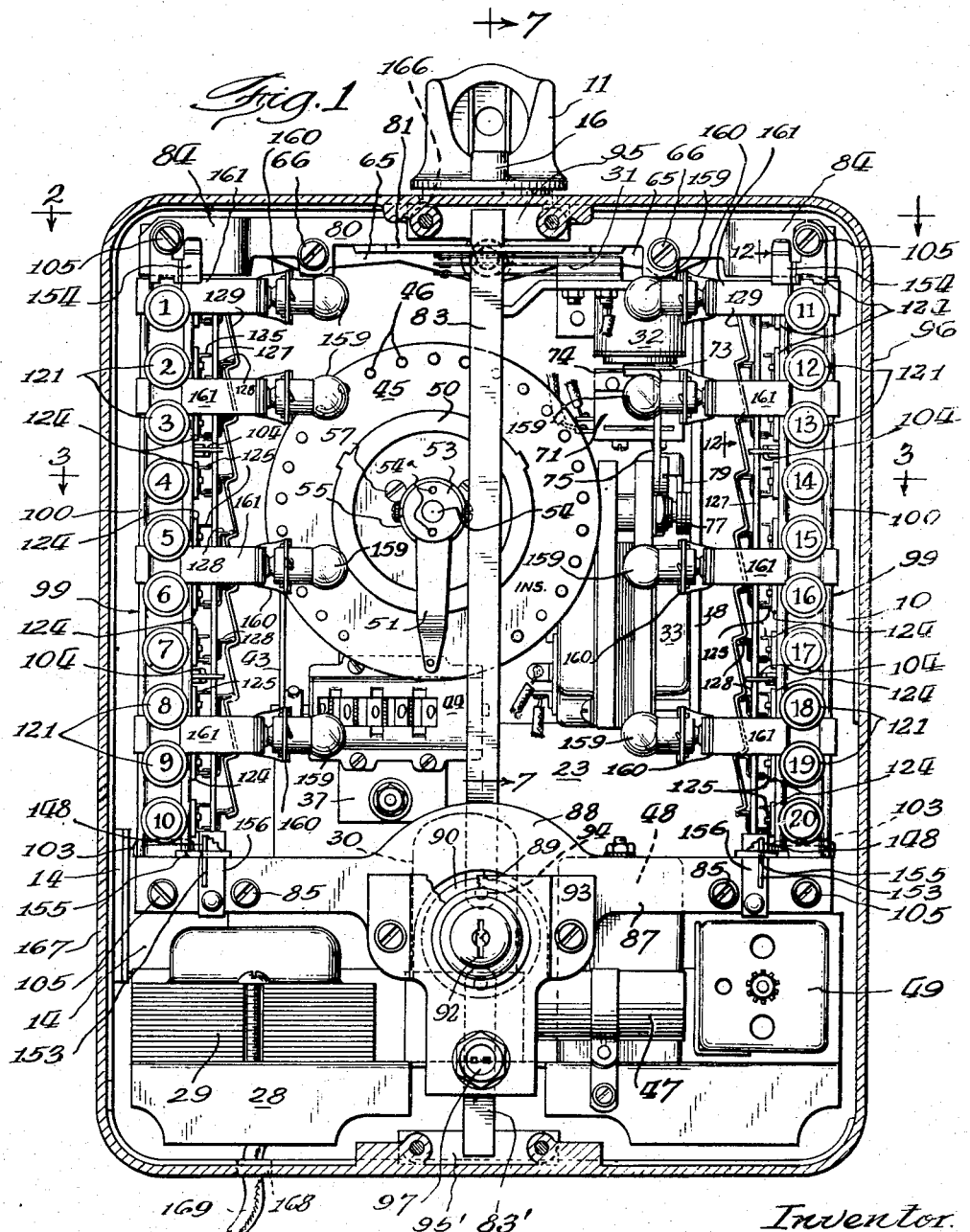
Figure 1 is a front sectional elevation of my improved remote control unit taken on the line 1—1 of Fig. 2, the outer cover thereof being shown in section and the title holding frame being removed to disclose mechanism normally located behind the title holding frame.

Referring to the drawings, my improved remote control unit comprises a rear base plate 10 upon which is mounted a receptacle 11 whereby a coin of suitable denomination may be inserted. The coin passes into a coin selector 12 of well known type which is mounted on the base plate 10. Rejected coins pass from the selector through a discharge opening 13 into a rejected coin pocket 14. A magnetic slug is retained in the selector by a magnet 15 and may be discharged therefrom by means of a button 16 which may suitably be mounted in the base of the coin receiving member 11. This button is adapted to cooperate with a lever 17 pivotally mounted on a bracket 18 which is also secured upon the base plate 10.

The lever 17 cooperates with a lever 19 pivotally mounted on the coin selector 12 and the lever 19 cooperates with an arm 20 in the coin selector which clears the magnetic coin away from the magnet and discharges it through the opening 13 into the rejected coin pocket 14. An accepted coin passes downwardly from the coin selector through a discharge opening 21 from which it drops into a coin box 22. This coin box is substantially housed in a lower bracket 23 which is also mounted on the base plate 10, the coin box being slidable into this bracket from the right in Fig. 5.

An accepted coin descending through the discharge opening 21 engages and swings a light arm 24 which is pivotally mounted on ears 25 carried by a bracket 26 which is mounted on one side of the coin selector 12. Also mounted on the bracket 26 is a leaf switch 27. When the arm 24 is swung to the right as viewed in Fig. 5, the switch 27 is closed momentarily.

Upon the lower end of the bracket 23 is mounted a chassis member 28 (Fig. 1) which serves as a support for a transformer 29 and a thermionic tube 30, an electrolytic condenser 47, a shielded oscillator coil 48, a shielded resonant filter coil 49, and associated electrical elements, the function and operation of which will hereinafter be fully described.

Figure 3:
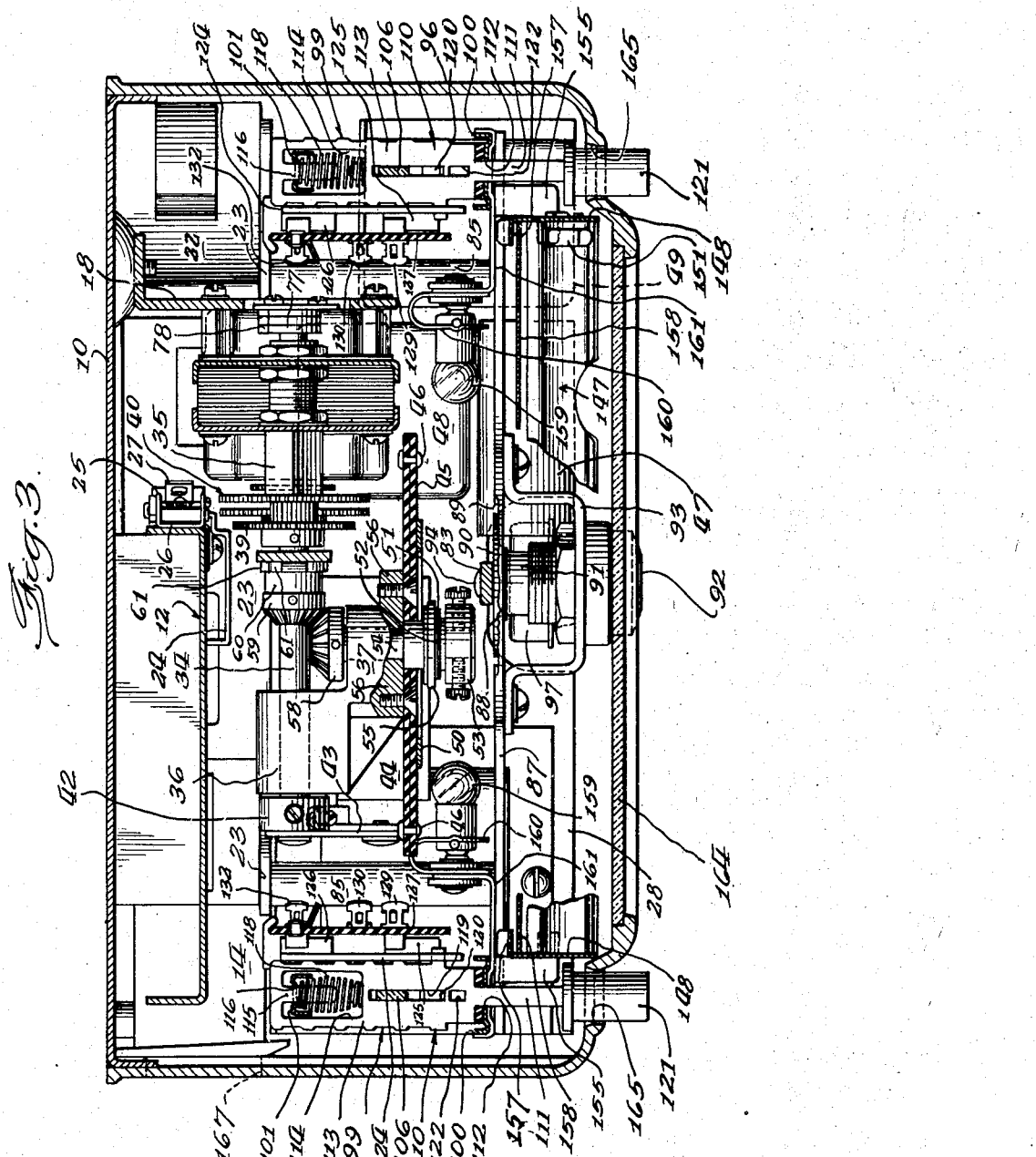
Fig. 3 is a sectional plan view of the remote control unit, the section being taken on the line 3—3 of Fig. 1.
Figure 4:
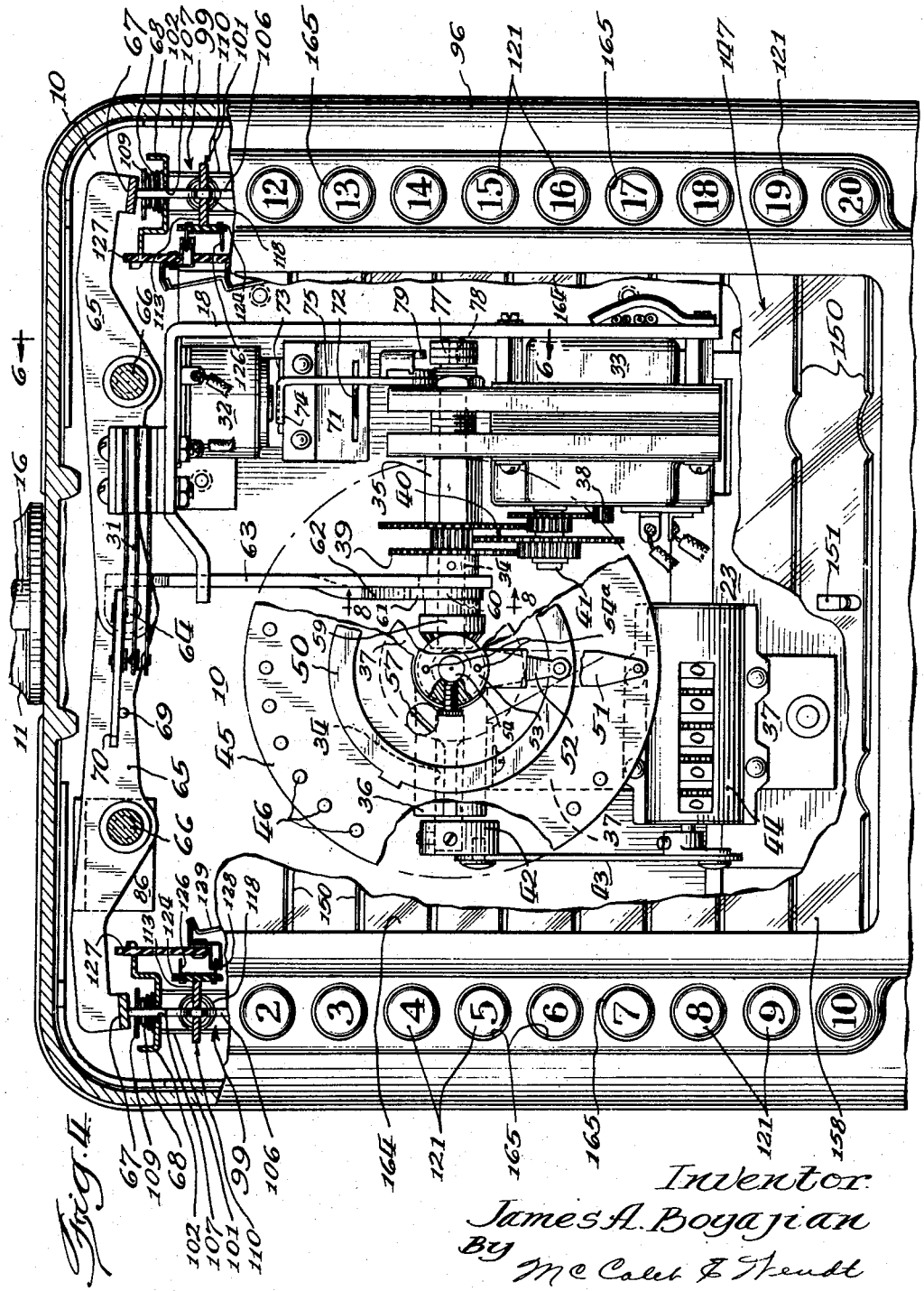
Fig. 4 is a front elevational view of the upper portion of the remote control unit, portions of the cover, window, title holding frame, and contact disc being broken away and other portions omitted to disclose interior mechanism.

The bracket 18 serves as a support for a three-pole switch 31, a relay 32 and a motor 33 (Fig. 1). A shaft 34 (Fig. 3) is mounted on a bearing 35 carried by the frame of the motor 33 and on a bearing 36 carried by a bracket 37 which is rigidly mounted on the bracket 23 (Fig. 4). The pinion 38 of the motor 33 is connected to a gear 39 rigidly carried by the shaft 34 through a train of reducing gearing 40 shown in Fig. 4. The elements of this gearing are mounted on the shaft 34 and on a stud shaft 41 carried by the motor 33.

At its innermost end the shaft 34 carries a crank arm 42 which is connected by a link 43 to a counter 44 so that this counter registers the number of revolutions made by the shaft 34. The counter 44 is mounted on the bracket 37, as shown in Fig. 4. The bracket 37 has rigidly mounted thereon a contact disc 45 of insulating material. This disc carries a plurality of contacts 46 which are spaced at equal distances around the disc 45, leaving a relatively blank space at the lower portion of the disc, as shown in Fig. 4.

These contacts may exceed the number of selections for which the device is intended. Thus, the device illustrated has a capacity of twenty selections and the number of contacts 46 may suitably be twenty-five. The first five contacts on the left of the vacant space as viewed in Fig. 4, are connected together in the manner shown in the wiring diagram of Fig. 15. Upon the disc 45 is mounted a contact ring 50. The contacts 46 and the contact ring 50 are adapted to be engaged by two arms 51 and 52 (Fig. 7) which are rigidly mounted upon a collar 53. The arms 51 and 52 make contact with each other and are mounted on the collar 53 with the aid of pins 54a of insulating material. Their hub portions are insulated from the collar 53 by suitable insulation 55.

The collar 53 is rigidly mounted upon a shaft 54 which is mounted in central relation with respect to the disc 45, the contacts 46 and the ring 50. The shaft 54 is rotatably mounted in a boss 56 of the bracket 37, the disc 45 being rigidly mounted on this boss by suitable screws 57. The end of the shaft 54 remote from the collar 53 rigidly carries a bevel gear 58 which meshes with a similar bevel gear 59 which is mounted on the shaft 34.

Rigidly mounted on the shaft 34 is a collar 60 which is provided with a cam member 61. The cam member 61 (Fig. 7) is adapted to engage a projection 62 on a bar 63 which is mounted for vertical movement. This bar 63 is bifurcated at its lower end and the bifurcated portions are located on opposite sides of the shaft 34, as shown in Fig. 8, these bifurcated portions being located between the boss of the collar 60 and the hub of the gear 39.

The upper end of the bar 63 is connected to a pivot 64 which passes through slots in overlapping ends of two levers 65 which extend from the center of the unit to positions adjacent the sides thereof. The levers 65 are pivotally mounted on posts 66, one of which posts is mounted on the base plate 10, the other being mounted on a bracket 86 carried by the base plate 10. As best seen in Fig. 4, the levers 65 are located at the top of the device and their outer ends carry forwardly extending abutment members 67. The outer ends of the levers 65 are biased upwardly by springs 68 which will hereinafter be described. As a result of the pressure of these springs, the bar 63 is normally pushed downwardly except when it is positively elevated by the cam member 61.

Upon the inner side of its pivotal support one of the levers 65 carries a pin 69 (Fig. 4) which is adapted to cooperate with a strip of insulation 70 carried by the upper leaf of the three-leaf switch 31. When the bar 63 is elevated by the cam 61 as shown in Fig. 4, the pin 69 is elevated and the upper leaf of the switch 31 is raised upwardly away from the second leaf. The second leaf is biased away from the lowermost leaf so that the three leaves of the switch 31 are separated when the bar 63 is elevated. When, however, the projection 62 on the bar 63 clears the cam 61 and the bar 63 moves downwardly, the upper leaf of the switch 31 moves downwardly into contact with the second leaf and carries this second leaf downwardly into contact with the third leaf so that the switch 31 is closed when the bar 63 is in its lower position.

The armature of the relay 32 is connected by means of a strip of insulation 71 to the lower leaf of a leaf switch 72 (Fig. 6). When the relay 32 is energized, the upward movement of the armature closes the switch 72. When the armature is in its lower position as shown in Fig. 6, a projection 73 carried by the armature engages the edge of an inwardly turned projection 74 on a bell crank lever 75. This lever is biased in clockwise direction, as viewed in Fig. 6, by a spring 76. When the relay 32 is energized, the armature moves upwardly, carrying the projection 73 above the inturned end 74 of the bell crank lever 75. This inturned end of the lever 75 then moves beneath the projection 73 so that the armature is held in its upward position and the switch 72 is held closed until the bell crank lever 75 is swung in counter-clockwise direction, as viewed in Fig. 6. When that movement of the bell crank lever 75 takes place, the armature of the relay 32 moves downwardly and the switch 72 is opened.

Figure 5:
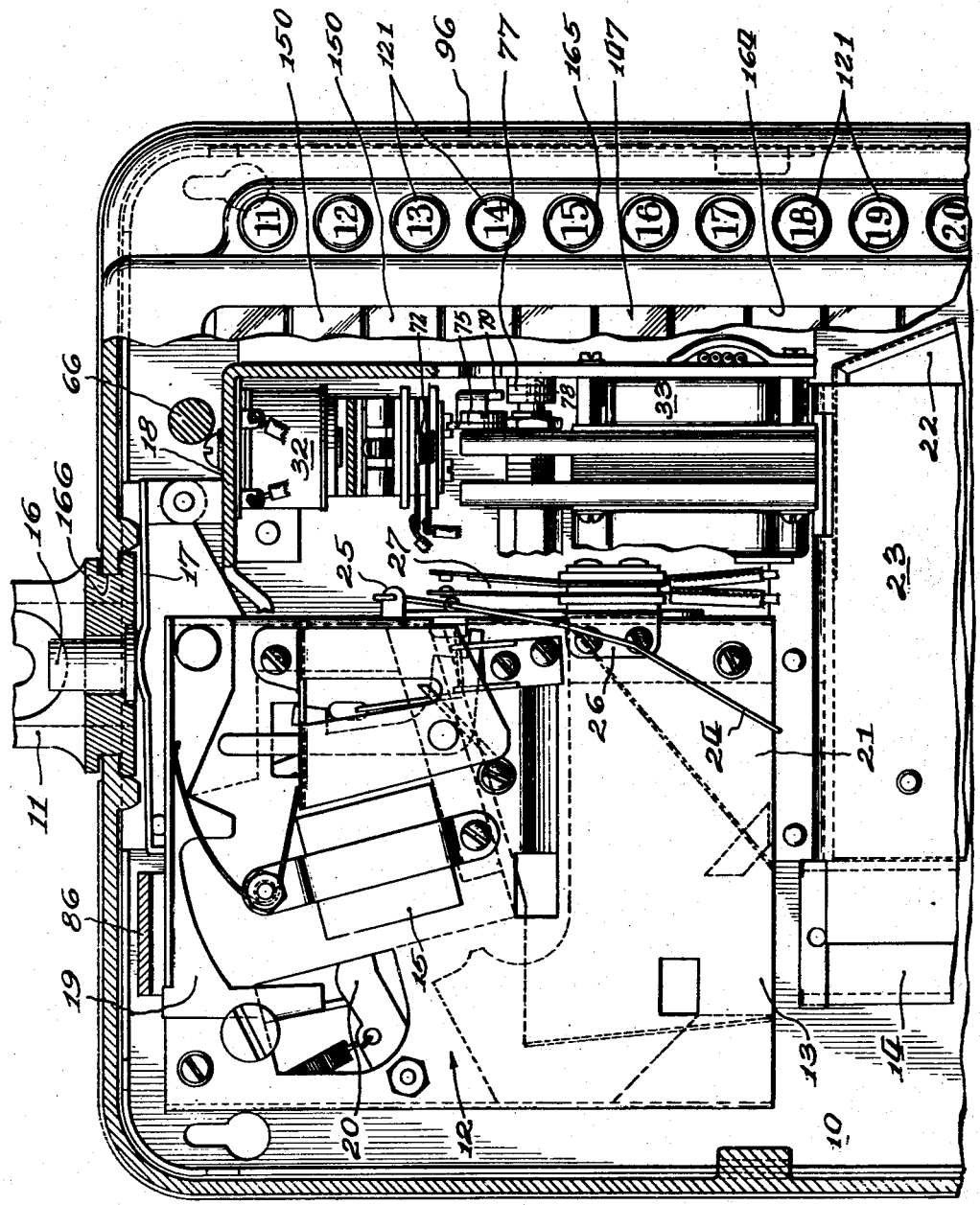
Fig. 5 is a similar view taken on line 5—5 of Fig. 2 in which the contact disc and the left-hand switch assembly and associated parts are omitted to disclose mechanism adjacent the rear side of the unit.

The bell crank lever 75 is intermittently moved by means of a cam member 77 which is rigidly carried on the right-hand end of shaft 34, as viewed in Figs. 5, 1 and 4. The cam member 77 carries a projection 78 which is adapted to engage a projection 79 carried on the horizontal arm of the bell crank lever 75 (Fig. 6). It will readily be understood that on each revolution of the shaft 34 the engagement of the projections 78 and 79 swings the bell crank lever 75 in the counter-clockwise direction as viewed in Fig. 6, so that the armature of the relay 32 is free to move downwardly and open the switch 72.

It may here be noted that in the normal condition of the machine the arms 51 and 52 are projected downwardly as shown in Fig. 4. The bar 63 is held at its highest position by the cam projection 61 as shown in that figure and the cam projection 78 is located from its operating position by a distance of 90 degrees as shown in Fig. 6.

Figure 2:
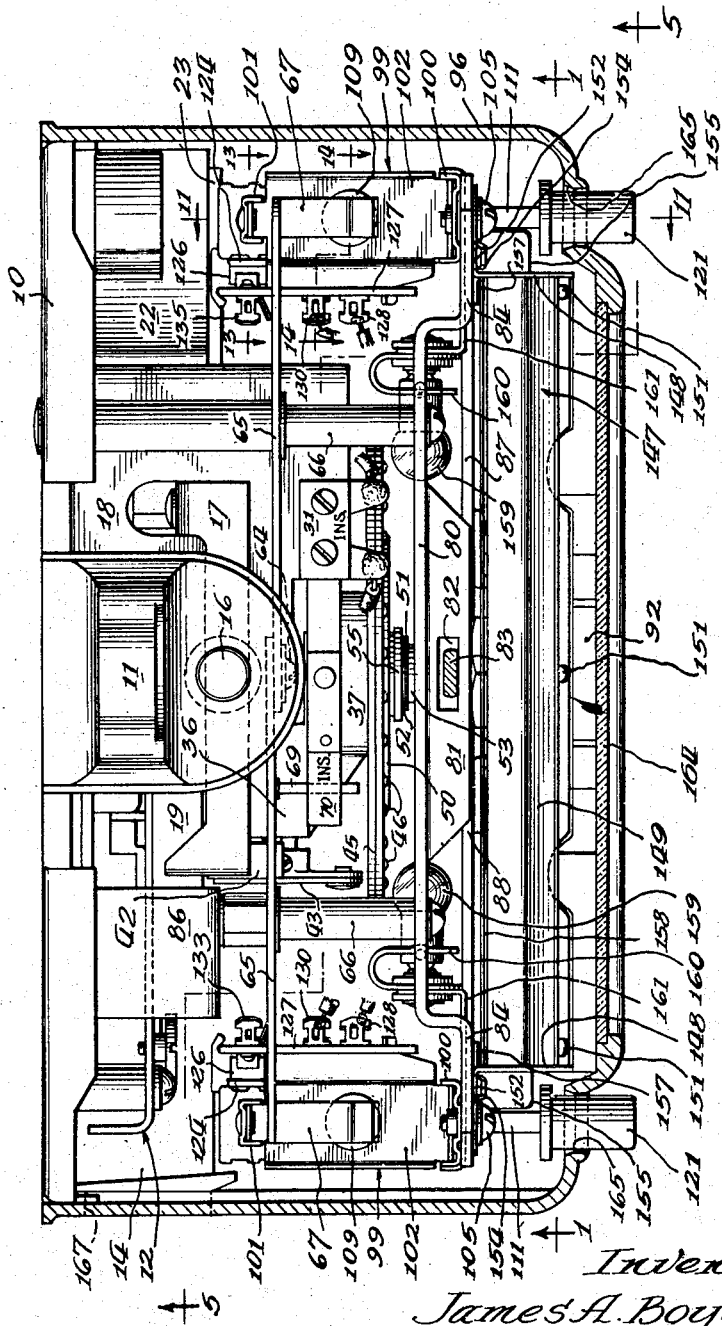
Fig. 2 is a sectional plan view of the remote control unit, the section being taken on the line 2—2 of Fig. 1, the cover being cut away to show the interior mechanism.

Upon the outer ends of the posts 66 previously referred to is rigidly mounted a horizontal bar 80. The intermediate portion of this bar is turned forwardly to provide a horizontal flange 81. This flange is provided with an opening 82 (Fig. 2) to serve as a guide for a locking bar 83. The extremities of the bar 80 are displaced forwardly to provide two end portions 84. Two posts 85 project outwardly from the bracket 23 and support a horizontal bar 87, which is located in the same plane as the outer ends 84 of the bar 80.

As shown in Fig. 1, the bar 87 is provided with a central enlargement 88 which is provided with an arcuate recess 89 for the reception of a disc 90 (Fig. 3) carried on the inner end of the rotatable member 91 of a tumbler lock 92. This lock is mounted by means of a bracket 93 (Figs. 1 and 3) upon the central portion 88 of the bar 87. The lower end of the locking bar 83 is secured to the disc 90 by means of a pivot pin 94. The lock 92 is so arranged that the key may be withdrawn therefrom at two positions at right angles to each other. When the lock is in the relation shown in Fig. 1, the bar 83 is projected upwardly in front of a bar 95 which is mounted on the cover 96 and which will hereinafter be more fully described. When the rotatable portion of the lock 92 is rotated in the clockwise direction through 90 degrees, as viewed in Fig. 1, the bar 83 is drawn downwardly clear of the bar 95. A similar bar 83', also pivotally connected to the disc 90 and guided in an opening in the chassis member 28, cooperates in the same manner and simultaneously with a bar 95' mounted on the lower end of the cover 96.

The bracket 93 serves as a support for a switch 97 which is adapted to be actuated by a suitable key which can be inserted from the front of the device.

On each side of the device is mounted a switch assembly 99. These switch assemblies are similar, with the exception that the contacts are located on the inner side of each assembly. Each switch assembly comprises a frame which includes a front rail 100, a rear rail 101, an upper frame member 102, a lower frame member 103 (Fig. 1), and intermediate frame members 104. The frame members 102, 103 and 104 are rigidly connected to the front and rear rails 100 and 101.

The switch frames are mounted on the outwardly displaced ends 84 of the bar 80 and on the ends of the bar 87 by means of screws 105 which extend through these ends and are threaded into the ends of the front rails 100. A locking bar 106 extends longitudinally through the center of the frame, being slidably mounted for axial movement in suitable openings 107 and 108 in the end frame members 102 and 103. The bar 106 extends freely through suitable openings in the intermediate frame members 104.

The upper reduced end of the locking bar 106 carries the spring 68 previously referred to. This spring bears against the upper side of the end frame member 102 and against a collar 109 rigidly mounted on the upper end of the locking bar 106. The upper ends of the locking bars are adapted to be engaged by the forwardly extending abutment members 67 previously referred to. It will readily be understood that when the cam 61 moves the bar 63 upwardly, the locking bars 106 will be depressed and when the cam 61 clears the projection 62 the springs 68 will bias the locking bars 106 upwardly again.

Each switch assembly comprises a plurality, for example in the present device 10, of selector bars 110. As best shown in Fig. 9, each selector bar comprises an outwardly directed shank portion 111 which is guided by an opening 112 in the outer rail 100. It also comprises a body portion 113 which is provided near its inner end with an enlarged opening 114 through which extends the rear rail 101. The body portion 113 includes an axial projection 115 which projects forwardly in guiding relation through an opening 116 in the rear rail 101. The body portion 113 also comprises an element 117 which projects inwardly into the opening 114 in alignment with the projection 115. A coil spring 118 is secured in position by the aligned projections 115 and 117. This spring bears against the rear rail 101 and against the forward edge of the opening 114 so that it biases the selector bar 110 outwardly.

The locking bar 106 extends through openings 119 provided in the selector bars 110. When the device is at rest the bar 106 occupies its full line position shown in Fig. 11, the abutments 67 being then in their lowermost position. Each bar 106 carries a plurality of locking detents 120, one of which is adapted to cooperate with each selector bar 110. When the bar 106 is in its depressed position, that is, the full line position in Fig. 11, the detents 120 are clear of their bars 110. When, however, the bar 106 is released so that it may move upwardly, the locking detents 120 come into cooperative relation with their bars 110.

In the case of a bar 110 which has not been moved inwardly by its button 121 carried on the outer end of the shank 111, for example, the lower bar 110 shown in Fig. 11, the upward movement of the bar 106 moves the detent 120 into the upper end of the opening 119. The detent 120 is provided on its forward side with a flat face so that it is not possible to push in another button 121 until the locking bars 106 are again depressed by the levers 65. In the case of an actuated bar 110 which has been manually pushed inwardly, for example, the upper bar 110 shown in Fig. 11, the detent 120 enters a locking aperture 122 provided in alignment with and immediately on the outer side of the aperture 119. Consequently the actuated bar 110 is held inwardly until the bar 106 is again depressed by the abutment 67. Each locking bar 110 carries a resilient washer 123 which is adapted to engage the inner side of the front rail 100 when the bar 110 is in its outer or forward position.

Each locking bar 110 has a strip of insulation 124 mounted on its inner side. The strip of insulation carries two contact members 125 and 126 located in forward and rearward positions, respectively. Each switch assembly comprises a strip of insulation 127 which extends along the length of the assembly adjacent to and in spaced relation to the strips 124. The strip of insulation 127 is rigidly mounted on suitable projections on the end frame members 102 and 103 and on the intermediate members 104.

Upon the strip 127 is mounted a series of contacts 128, one for each bar 110. The contacts 128 of both switch assemblies are connected together to a common line 129. As best seen in Fig. 12, the contacts 128 are always in engagement with the contacts 125 on the strips 124. When a bar 110 is moved inwardly by its button 121, for example, the uppermost bar in Fig. 12, its contact 125 is brought into engagement with the corresponding contact 130 mounted on the strip 127. The contacts 130 of both switch assemblies are connected together to a common line 131. It will thus be seen that when any button 121 is pushed inwardly, the conductors 129 and 131 are connected together.

The strip 127 carries along its innermost side a series of bridging contacts 132 which are normally in series with the contacts 126. The left-hand assembly carries at its upper end a contact 133 in alignment with the contacts 132. This contact cooperates with the contact 126 of the uppermost bar as shown in Fig. 12. A similar contact 134 (Fig. 15) at the lower end of the left-hand strip 127 cooperates with the contact 126 of the lowermost bar. A similar contact 135 is mounted at the upper end of the right-hand strip 127 and a similar contact 136 is mounted at the lower end of this strip to cooperate with the contacts 126 of the uppermost and lowermost selector bars on the left-hand side.

The contact 133 is connected to the first six of the contacts 46 beginning at the lower left-hand portion of the disc 45 shown in Fig. 4 and is further connected to a conductor 137 (Fig. 15). The bridging contact 132 immediately below the contact 133 is connected to the seventh contact of the series 46 and the consecutive contacts 132 are in order connected to contacts 46 in the manner shown in Fig. 15. The contact 135 is connected to the contact 134 and also to the sixteenth contact of the series 46. The contacts 132 below the contact 135 are connected in order to the seventeenth to twenty-fourth contacts of the series. The contact 136 is connected to the last or twenty-fifth contact of the series 46.

In the inoperative condition of the device the contacts 126 connect the contact 133, the contacts 132 of the left-hand switch assembly, the contact 134, the contact 135, the contacts 132 and the contact 136 in series. When one of the buttons 121 is pressed inwardly, for example, the seventh button of the left-hand switch assembly, which corresponds to the selection of record No. 7, the seventh contact 126 is displaced inwardly to break this circuit. Consequently, only the first twelve contacts of the series 46 are connected to the conductor 137. As will hereinafter be explained, only the first twelve contacts of the series 46 are energized and the machine will function to transmit twelve impulses, with the result that record No. 7 is selected and played. Similarly, if any other button 121 is pressed, the corresponding number plus five impulses are transmitted and the corresponding record is selected and played.

The conductor 131 is connected to one terminal of the motor 33 and to one of the leaves of the three-leaf switch 31. The other side of the motor is connected to a power line 138 to which is connected a conductor 139 and one side of the coin actuated switch 27. The other side of the switch 27 is connected to the relay 32. The other side of the relay 32 is connected by a conductor 140 to the other power line 141. The conductor 129 is connected to one side of the relay actuated switch 72, the other side of which is connected to a conductor 142 which is connected to a conductor 143. The conductors 142 and 143 are connected through the switch 97 which is the main switch of the device to the power line 141. The conductor 140 is connected by a line 145 to one of the leaves of the three-leaf switch 31. The conductor 142 is connected by a line 146 to the third leaf of the three-leaf switch 31.

The thermionic tube 30 may suitably be a 70L7GT tube comprising in the same element a diode plate 171, a diode cathode 172 and a heater 173 for said cathode, and also pentode elements including a plate 174, a screen grid 175, a control grid 176, a cathode 177 and a heater 178 for said cathode. The transformer 29 comprises a primary winding 179, one side of which is connected through conductor 143 and switch 97 to power line 141. The other side of the winding is connected by the conductor 139 to the power line 138.

The transformer comprises three windings 180, 181 and 162. The heaters 178 and 173 are connected in parallel to the winding 181 by conductors 182 and 183. One side of the winding 180 is connected to the plate 171, the other side being connected to the corresponding side of the winding 181 and to the condenser 47, which suitably may be a 12 microfarad condenser, and to a resistor 184 arranged in parallel thereto. This resistor may suitably have a resistance of 20,000 ohms. The other sides of the condensers 47 and the resistor 184 are connected by a conductor 185' to the diode cathode 172, which is also connected by a conductor 186' to the conductive ring 50. The conductor 185' is connected to the line 182 through a by-pass condenser 187 which may suitably be a .005 microfarad condenser. The conductor 182 is connected by a conductor 188 to one end of the oscillator coil 48. This end of the coil is connected through a condenser 189, which may suitably be a .05 microfarad condenser to the conductor 129. The opposite ends of the coil 48 are connected through a trimmer condenser 190 to the conductor 188.

The conductor 137 is connected to both the plate 174 and the screen grid 175 of the pentode elements of the tube 30 so that these elements act as a single plate. The cathode 177 is connected to a point on the oscillator coil 48, for example, the center tap of this coil, and it is also connected to resilient contacts 230 through a condenser 231. The resilient contacts 230 normally bear against the lower ends of the bars 106 and are arranged to follow the bars upwardly until these bars approach their uppermost positions. In these positions the bars 106 are clear of the contacts 230. When the bars 106 are down, the transmitter is detuned and when they are up, the transmitter is tuned to the receiver. Thus the transmitter is detuned and rendered ineffective for transmitting purposes except when the bars 106 are elevated into a high position. At that time the motor 33 has been in operation for a sufficient period of time to elevate the bars 106 into locking position as shown in dotted lines in Fig. 11. Consequently the transmitter is maintained in inoperative condition until after the selector bars 110 are locked against manipulation. The control grid 176 is connected through a condenser 191 to another point on the coil 48. The condenser 191 may suitably have a capacity of .0005 microfarad. A high resistance grid leak 192 is arranged in parallel with the condenser 191.

A conductor 193 is connected to a suitable point on the oscillator coil 48, for example, a point relatively close to the end of the coil which is connected to conductor 188. The conductor 193 is connected through a resonant filter coil 49 and a trimmer condenser 194 to the conductor 139. When plate current is supplied to the plate elements 174 and 175, the pentode elements feed energy to the oscillator coil 48. This oscillator coil is tuned by the condenser 190 to a desired frequency, for example, a frequency of 250 kilocycles. The resonant filter coil and the condenser 194 constitute a tune filter which is tuned to the same frequency, that is, 250 kilocycles, for example, by adjustment of the trimmer condenser 194.

Plate current is supplied to the plate elements 174 and 175 each time that the arm 51 engages one of the contacts 46 which is connected to the conductor 137. Positive plate voltage is supplied from the diode cathode 172 through conductor 186' to the ring 50. This positive plate voltage is supplied to the arm 51 by the ring 50 and arm 52. When the arm 51 engages any one of the first six contacts 46 an impulse of plate current is supplied to the plate elements 174 and 175. Further impulses may be supplied to these plate elements as the arm 51 moves over the following contacts 46. The effect of the switch contacts 126 in their normal position is to connect all of the contacts 46 to the conductor 137. If one of the buttons 121 is actuated, for example, the button corresponding to selection No. 7, then the corresponding switch 126 is opened and only the first twelve contacts 46 are connected to the plate elements 174 and 175. Consequently these plate elements receive twelve impulses of plate voltage and the result is that twelve impulses of 250 kilocycles frequency are supplied to the power lines 138 and 141. Similarly, when any button is pressed corresponding to a selection bearing any number between 1 and 20, the lines 138 and 141 receive a corresponding number, plus five impulses of 250 kilocycle frequency. These impulses are communicated to the lines 185 and 186 which extend through the building and they pass in this way to the main unit which will hereinafter be described.

Between the two vertical rows of buttons 121 I mount a title holder 147 which comprises two side rails 148, a top rail 149 and a similar bottom rail (not shown), these rails being connected to provide a rectangular frame. The two side rails 148 are connected by a series of title holding bars 150 which extend in the horizontal direction and are located in oblique position as best shown in Fig. 7. These bars have stamped out of them clip formations 151 which are adapted to hold title cards in position for view from the front of the device.

As best seen in Fig. 5, the title holding bars 150 are located in alignment with the buttons 121 so that a card bearing a title of the recording controlled by each button 121 may be located alongside that button. The title holding frame may be held in position by means of ears 152 which project laterally from the rails 148 at their upper end and by means of reduced extensions 153 of these rails at their lower ends (Fig. 1). The ears 152 at the upper end of the title holding frame are adapted to be engaged by clips 154 mounted on the forwardly displaced ends 84 of the bar 80. The reduced ends 153 of the rails 148 are adapted to be engaged by hook-form ears 155 which are bent outwardly from the bar 88. Springs 156 mounted on the bar 88 force the reduced ends 153 firmly against the hook-form ears 155.

The rear edges of the rails 148 are turned inwardly (Fig. 3) to provide flanges 157 which are adapted to hold a sheet of translucent material 158 in position behind the title holding bars 150. Behind the sheet 158 of translucent material I provide a plurality of lamps 159 for the illumination of the cards on the title holding bars 150. The lamps 159 are supported in sockets 160 carried by arms 161 which are mounted on the front rails 100 of the switch assemblies. The lamps 159 are connected in parallel and are supplied with current from the secondary 162 of the transformer 29.

The device is provided with a removable cover 96 which is adapted to be applied over the mechanism and around the periphery of the base plate 10. The cover is provided with a window 164 whereby the titles on the title holding frame may be observed. The cover is provided with openings 165 through which the buttons 121 project. The cover is also provided with openings (not shown) through which extend the forward portions of the lock 92 and switch 97 so that they may be actuated from the exterior of the cover. The cover is also provided with a recess 166 which is conformed to the base of the coin receiving receptacle 11 so that the coin receiving receptacle 11 is exposed and likewise the button 16 which is mounted in the base thereof. The cover is likewise provided with an opening 167 in alignment with the open end of the rejected coin pocket 14 (Fig. 3) so that rejected coins may be retrieved by the operator. The cover is also provided with a recess 168 adapted to accommodate a cable 169 which includes the two power lines 138 and 141, this cable being suitably provided with a plug 170 whereby the device may be plugged into any suitable power outlet.

My remote control unit may be employed to control the operation of a phonograph which is energized from the power lines 185 and 186 and to effect the playing of any desired record thereon corresponding to any one or more of the selector buttons 121. For example, the remote control selector may be associated with the phonograph described in my copending application Serial No. 259,586, now U. S. Letters Patent 2,388,595 granted November 6, 1945. My improved remote control selector may also be employed in connection with the phonograph described and claimed in application Serial No. 342,419 filed of even date herewith by Marion R. Winkler.

The solenoids 195 are arranged in a circular series, each including an armature 240 which is normally in its low position shown on the left of Fig. 17. The armatures 240 have lower extensions 241 which carry cylindrical insulating pieces 242 and conductive pieces 243. The insulating pieces 242 are normaly engaged by an insulated spring 244. When one of the solenoids 195 is energized its armature 240 is moved upwardly bringing its conductive piece 243 into engagement with the insulated spring 244 thus grounding the spring 244 through the frame 245 which supports the solenoids 195, as shown on the right-hand side of Fig. 17. The insulated spring 244 is connected to one side of a switch 246, the other side of which is grounded. The common sides of the spring 244 and the switch 246 are connected to a relay 247. The switch 248 of the relay 247 is in series with the phonograph motor 249, motor 249 and the switch 248 being connected to the power lines 185 and 186. The other side of the relay 247 is connected to the secondary of a transformer 250, the other side of the secondary being grounded. The primary of the transformer 250 is connected across the power lines 185, 186. When the phonograph is at rest, the switch 246 is open. When one or more of the solenoids 195 is energized its armature 240 is moved upwardly and the relay 247 is energized by the completion of the circuit 243, 244, relay 247 and secondary of the transformer 250. Consequently, the switch 248 is closed and the motor 249 is put into operation to effect the record changing cycle of the phonograph and to play the corresponding record. At the beginning of the record changing cycle, the switch 246 is closed so that the motor 249 remains in operation until the selected record or records have been completed. The phonograph comprises a shaft 251 which is given a complete revolution during each record changing period. The shaft 251 carries with it a disc 252 which is provided with an abutment 253 which is adapted to engage non-ferrous pins 254 which have been projected upwardly by actuated armatures 240. The non-ferrous pins 254 are slidably supported so that they move upwardly with their armatures 240, as shown at the right of Fig. 17. The shaft 251 is driven through a frictional connection so that it is arrested when the abutment 253 strikes an upwardly displaced pin 254. The shaft 251 is connected to the phonograph selector so that the record played depends upon the point at which it is arrested by one of the pins 254. The disc 252 carries a slidable member 255 which is projected downwardly momentarily during the latter part of the record changing cycle. The member 255 is so located that it is in alignment with the pins 254 which has arrested the abutment 253.

It will readily be understood that if my selector is operated so as to energize a plurality of solenoids 195, the motor 249 is maintained in operation during the playing of the corresponding records, the corresponding pins 254 being engaged one after the other by the abutment 253 so as to control the playing of the corresponding records one after the other. Before the last record has been completed the member 255 pushes down the last pin 254. Before this occurs the switch 246 is closed and consequently the relay 247 is energized until the last record is reproduced. Thereupon, the record changing cycle starts opening the switch 246 so that the motor 249 is deenergized. The motor remains out of operation until one or more of the solenoids 195 is again energized.

The electrical system whereby the impulses transmitted over the lines 185 and 186 are picked up and caused to energize the corresponding solenoids 195, will now be described, it being understood that the devices illustrated in Fig. 16 are located on the phonograph and not on the remote unit which has been previously described.

This electrical system on the phonograph comprises a power supply unit 196, a rectifier 197 for the supply of direct current to certain relays, and an amplifier 198. The amplifier 198 is adapted to receive the high frequency impulses delivered by the oscillator in the remote control unit and to amplify and rectify these impulses. The final result of these impulses is the energization of a gas tube 199 at the output end of the amplifier. This gas tube may suitably be a 2A4G tube and its plate is supplied with alternating current. Owing to the alternation of the plate voltage, the gas tube 199 is rendered inoperative at the termination of each impulse. Consequently, the gas tube is rendered operative for a short time when each impulse is being received. The result is that a relay 202 is energized for a corresponding number of times and the switch 203 is closed for that number of times.

On the first closure of the switch 203 the relay 204 is energized, the winding of the relay 204 being in the plate circuit of the rectifier 197. The relay 204 is a time-delay relay and consequently it remains energized during a series of impulses transmitted from the oscillator in the remote control unit. When the relay 204 is energized, the switch 205 is closed, the switch 206 is opened and these switches remain closed and opened, respectively, during a series of impulses corresponding to the recording selected. When the switch 205 is closed, the relay 207 is energized, and the switch 208 is closed.

The cathode of the tube 197 is connected to the winding of the relay 204 and to one side of the switch 205. The other side of the relay 204 is connected to one side of the switch 203. The other side of the switch 205 is connected to the winding of the relay 207. The switch 206 is connected to one side of the switch 208. The other side of switches 203 and 208 and the winding 207 are connected to the power line 186. The two switches 206 and 208 are connected together and the other side of the switch 206 is connected to the common line 210 of the solenoids 195.

The relay 202 effects the stepwise movement of an arm 211 of a stepping relay 212. On the first impulse the arm 211 is moved into contact with the first of a series of contacts 213 which correspond to the contacts 46 of the remote control unit. The second impulse of the series brings the arm 211 into contact with the second contact 213 and so forth. Thus, when selector button 121 corresponding to recording No. 7 is actuated, twelve impulses are transmitted over the power lines and the relay 202 is actuated twelve times. Consequently, the arm 211 moves into engagement with the contact 213 which is connected to the solenoid 195 corresponding to recording No. 7.

The relay 204 controls means which prevents the return of the arm 211 to initial position during the period that a series of impulses is being received. At the end of the series of impulses the relay 204 becomes deenergized and the relay 207 becomes deenergized so that the arm 211 is released and returns automatically to its initial position. The arm 211 is adapted to engage any one of the contacts 214 and it is also in contact with a strip 214 of conductive material. This strip is connected to the power line 185.

When a series of impulses is transmitted from the remote control unit, the receiver 198 picks up these impulses, being tuned to the same frequency. Consequently, the relay 202 is energized a corresponding number of times and the arm 211 is moved to the contact 213 corresponding to the recording selected. When the switch 203 is closed by the first impulse, the relay 204 is closed, closing the switch 205 and opening the switch 206. The closing of the switch 205 energizes the relay 207 and the switch 208 is closed.

While the series of impulses is being received, switches 205 and 208 are closed while switch 206 is open. Owing to the open condition of the switch 206, no circuit can be completed through the solenoids 195 during the reception of a series of impulses. When the series of impulses is terminated, the switch 203 opens. As a result after a slight delay, switch 205 opens and switch 206 closes. Before the switch 208 opens, a circuit is completed for a brief interval from power line 186, switch 208, switch 206, conductor 210, the solenoid 195 corresponding to the position of the arm 211, the corresponding contact 213, arm 211, conductive strip 214 and power line 185. This circuit is broken by the deenergization of the relay 207 which permits the switch 208 to open.

When the relay 204 is energized, the arm 211 is released so that it can return to its initial position. Before the arm 211 moves away from the contact 213 with which it is in engagement, the circuit through the arm 211, the solenoid 195 corresponding to its position, and the switches 206 and 208, is completed for a short instant and the switch 208 opens before the arm 211 is moved away from its position corresponding to the selected recording.

As described in the aforesaid application Serial No. 342,419 filed of even date herewith by Marion R. Winkler, the energization of the solenoid 195 corresponding to the selected button 121 results in the playing of the corresponding record. It is further to be noted that any desired number of solenoids 195 may be actuated by the remote control unit with the result that all the corresponding recordings may be reproduced by the phonograph and when the armatures of all the solenoids 195 have been returned to initial position, the operation of the phonograph is terminated.

In normal operating condition the cover 96 encloses the mechanism of the remote control unit, the bars 83 and 83' being in locked relation to the bars 95 and 95'. The main switch 97 is turned on by a suitable key and the remote control unit is ready for actuation, it being understood that current is being supplied to the phonograph. The abutments 67 are holding the locking bars 106 depressed so that they occupy their full line position shown in Fig. 11. Consequently, if one of the buttons 121 is pushed inwardly, it will not remain in its innermost position. Such actuation of one of the buttons 121 will have no effect, because switches 72 and 31 are open.

A coin is now inserted in the coin receiving member 11 and the switch 27 is closed momentarily. The closing of the switch 27 energizes the relay 32 and its armature is latched in its uppermost position, closing the switch 72. When one of the selector buttons 121, for example, button No. 7, is now actuated, the corresponding contact is moved to circuit-opening position and the corresponding contact 125 is moved to circuit-closing position. The result is that the motor 33 goes into operation.

Immediately the motor 33 starts driving the shaft 34, the cam 61 clears the projection 62 so that the bar 63 is able to move downwardly and the locking bars 106 are moved upwardly, both movements being effected by the springs 68. The downward movement of the bar 63 and the adjacent portions of the lever 65 results in the closing of the three-leaf spring 31. The upward movement of the locking bars 106 enables one of the detents 120 to project into the opening 122 of the actuated selector bar 110. Consequently, the corresponding switch contact 125 remains in closed position and the corresponding contact 126 remains in open position until the bars 106 are again depressed.

After the shaft 34 has rotated through a relatively small angle, for example, 90 degrees, the projection 78 engages the detent 79 of the bell crank lever 75 and swings this lever in counter-clockwise direction as viewed in Fig. 6. Consequently, the armature of the relay 32 is unlatched and is moved by its spring downwardly to open the switch 72. At this time the switch 31 is closed so that the motor continues to operate through the circuit which includes conductor 145. It is to be noted that the opening of the main switch 97 will not interrupt the operation of the motor. If this were possible, a plurality of records could be played for a single coin by one possessing the key controlling the switch 97. As has been heretofore pointed out, the opening of the contact 126 corresponding to a particular recording, for example, recording No. 7, has the effect of connecting conductor 137 to the first twelve contacts of the series 46.

The arms 51 and 52 moving over the contacts 46 consequently connect the cathode 172 to the plate elements 174, 175 of the tube 30 twelve times. Twelve high frequency impulses having a frequency of 250 kilocycles are supplied to the lines 185 and 186. After the arm 51 has moved over all the contacts and when the shaft 34 has almost made one revolution, the cam 61 engages the projection 62 and moves the bar 63 upwardly. This upward movement results in the downward movement of the locking bars 106 and the opening of the switch 31. The motor circuit is now broken and the motor remains inoperative until another coin is inserted.

It may here be noted that if two of the buttons 121 are pushed at one time, only one series of impulses will be transmitted, being that series corresponding to the button of lowest number. This results from the fact that the button of lowest number, for example, button No. 7, moves the corresponding contact 126 to open position so that all of the contacts 46 above the twelfth of the series are disconnected from the conductor 137. After the switch 72 is opened, another coin may be inserted to close this switch and after the motor 33 stops operating, any of the other buttons 121 may be actuated to select another recording. When this is done a corresponding number of impulses of high frequency current are supplied to the lines 185 and 186.

Each series of impulses is transmitted through the wires 185 and 186 to the amplifier 198 and the relay 202 is energized a corresponding number of times. Thus, if the button 121 corresponding to selection No. 7 is actuated, twelve impulses go over the lines and the relay 202 is actuated twelve times in succession. Such action, as has been previously described, results in the movement of the arm 211 into the twelfth contact of the series 213. When the series of impulses ceases, a current flows through the solenoid 195 connected to the twelfth contact of the series 213 and the displacement of the armature of this solenoid results in the playing of recording No. 7. Actuation of any of the other buttons 121 likewise results in the displacement of the armatures of the corresponding solenoids 195, and, as previously indicated above, the phonograph continues to play the corresponding recordings until all the actuated armatures have been returned to normal position and the corresponding recordings played.

My improved remote control devices described above may readily be adapted for selection by space transmission. For this purpose the remote control unit may be provided with an exposed loop antenna 220 (Fig. 15A), instead of the oscillator coil 48. The ends of the loop antenna are connected together and to the conductor 188. The antenna circuit includes a trimmer condenser 221 and is tuned by this condenser to a suitable frequency, for example, 250 kilocycles. The cathode 177 of the tube 30 is connected to a suitable point, for example, the mid point of the antenna. The grid 176 is connected through the condenser 191 and the grid leak 192 to another point on the antenna, as shown in Fig. 15A. The antenna 220 and condenser 221 replace the oscillator coil 48 and condenser 190 of the previously described embodiment. The antenna is put into oscillation when the pentode elements of the tube 30 are rendered active in the manner previously described and each impulse is broadcast by the antenna 220.

As shown in Fig. 16A, the amplifier 198 may be modified to receive the impulses transmitted by the antenna 220. For this purpose the primary input coil is omitted and the secondary coil is replaced by an antenna 222 which is tuned by a condenser 223 to the same frequency. This antenna is connected to the control grid of the first tube of the amplifier 198. It will be readily understood that when the device is operated in the manner previously described, the loop antenna 220 transmits a series of impulses corresponding to the record selected and that these impulses are received by the antenna 222 with the result that the relay 202 is energized a corresponding number of times, with the result that the phonograph is put into operation to play the record selected.

It will also be understood that in the case of this embodiment, any number of recordings may be selected and the corresponding armatures of the solenoids 195 will be displaced. The phonograph will operate to play all the corresponding records and return the corresponding armatures of the solenoids 195 to initial position. This embodiment of the invention operates in precisely the same manner as did the embodiment of the invention first described, with the exception that the series of signals is transmitted from the remote control unit to the phonograph by space transmission instead of over the power lines 185 and 186.

Although the invention has been disclosed in connection with the specific details of preferred embodiments thereof, it must be understood that such details are not intended to be limitative of the invention except in so far as set forth in the accompanying claims.

Having thus described my invention, what I claim as new and desire to secure by Letters Patent of the United States is:

1. A control mechanism for selective phonographs comprising individual means adapted to be actuated to effect the playing of a corresponding recording, a control circuit comprising one of a series of contacts, switches connecting said contacts in series and a conductive member adapted to move over said contacts, a plurality of selector members adapted to open any of said switches whereby to cut any desired number of contacts out of said circuit, motor means for causing said member to move over all of said contacts, a switch associated with each of said selector members for controlling the operation of said motor means, a coin-controlled switch in series with last said switch, a switch in parallel with the coin-controlled switch, means actuated by the motor to open the coin-controlled switch and to open and close the parallel switch, and means responsive to the closing of said circuit for a definite number of times to actuate a corresponding individual means.

2. A selector mechanism for selective phonographs comprising individual means adapted to be actuated to effect the playing of a corresponding recording, a transmitter tuned to definite radiofrequency, means for detuning said transmitter, automatic selective mechanism for controlling said transmitter to cause it to transmit a definite number of impulses corresponding to a desired recording, manual means for initiating the operation of said mechanism, means operated by said mechanism for rendering said detuning means ineffective, means adapted to receive impulses of said radio frequency, and means controlled thereby adapted to actuate said individual means in accordance with the number of impulses received.

JAMES A. BOYAJIAN.